US008015289B2

(12) United States Patent
Hill et al.

(10) Patent No.: US 8,015,289 B2
(45) Date of Patent: Sep. 6, 2011

(54) SYSTEM AND METHOD PREDICTING AND MANAGING NETWORK CAPACITY REQUIREMENTS

(75) Inventors: Daron Chris Hill, Appleton, WI (US); Jonathan McCormack Landon, Appleton, WI (US); Terence Raymond Addison, Knoxville, TN (US)

(73) Assignee: Ziti Technologies Limited Liability Company, Dover, DE (US)

( * ) Notice: Subject to any disclaimer, the term of this patent is extended or adjusted under 35 U.S.C. 154(b) by 1279 days.

(21) Appl. No.: 10/733,866

(22) Filed: Dec. 11, 2003

(65) Prior Publication Data
US 2005/0132051 A1    Jun. 16, 2005

(51) Int. Cl.
  *G06F 15/173* (2006.01)
(52) U.S. Cl. ............... 709/226; 709/224; 709/223
(58) Field of Classification Search ............. 709/224
  See application file for complete search history.

(56) References Cited

U.S. PATENT DOCUMENTS

| | | | |
|---|---|---|---|
| 5,799,317 A | 8/1998 | Shen et al. | |
| 5,987,442 A * | 11/1999 | Lewis et al. | 706/10 |
| 6,125,105 A * | 9/2000 | Edwards et al. | 370/230 |
| 6,209,033 B1 * | 3/2001 | Datta et al. | 709/224 |
| 6,240,463 B1 * | 5/2001 | Benmohamed et al. | 709/238 |
| 6,269,401 B1 * | 7/2001 | Fletcher et al. | 709/224 |
| 6,272,110 B1 * | 8/2001 | Tunnicliffe et al. | 370/232 |
| 6,466,980 B1 * | 10/2002 | Lumelsky et al. | 709/226 |
| 6,604,138 B1 * | 8/2003 | Virine et al. | 709/224 |
| 6,889,204 B2 * | 5/2005 | Sanada et al. | 705/32 |
| 7,143,153 B1 * | 11/2006 | Black et al. | 709/223 |
| 7,219,300 B2 * | 5/2007 | Arquie et al. | 715/736 |
| 7,403,994 B1 * | 7/2008 | Vogl et al. | 709/227 |
| 2002/0087696 A1 * | 7/2002 | Byrnes | 709/226 |
| 2002/0095493 A1 * | 7/2002 | Byrnes | 709/224 |
| 2004/0004939 A1 * | 1/2004 | Yegenoglu | 370/252 |
| 2004/0202160 A1 * | 10/2004 | Westphal | 370/389 |
| 2005/0132051 A1 * | 6/2005 | Hill et al. | 709/226 |

OTHER PUBLICATIONS

International Search Report from PCT/US2004/016934 dated Nov. 10, 2004.

* cited by examiner

*Primary Examiner* — David E England
(74) *Attorney, Agent, or Firm* — Knobbe, Martens, Olson & Bear, LLP (57) ABSTRACT

A system and method for maintaining capacity of a network. Instructions are adapted to define future times at which a capacity of the network is evaluated. In addition, instructions are adapted to determine a total capacity of the network (TNC) and a total demand of users (TUD) for the network at each of the future times. As a function of the total capacity of the network (TNC) and the total demand of users (TUD), instructions are adapted to determine a predicted utilization (PU) of the network at each of the future times. By comparing the predicted utilization (PU) to a defined acceptable utilization of the network at each of the future times, instructions are adapted to determine a change in network capacity (DCNC) to be applied to the network at each of the future times in order to increase or decrease the capacity of the network.

35 Claims, 4 Drawing Sheets

SYSTEM AND METHOD PREDICTING AND MANAGING NETWORK CAPACITY REQUIREMENTS

FIELD OF THE INVENTION

Embodiments of the invention generally relate to network capacity forecasting and management as well as user demand forecasting. In particular, embodiments of the invention relate to a system and method for evaluating and for taking into account various factors in order to predict and maintain a capacity of a communications network to meet anticipated needs and changes at some future point in time.

BACKGROUND OF THE INVENTION

In the past, managers of networks such as communications networks faced a severe challenge in trying to predict impacts of ever changing network capacity requirements. Particularly, user demand for applications operating via the networks, unit cost of network capacity, and logistics of network utilization may have substantial impacts on a preferred level of network capacity. The challenge becomes especially severe when new large-scale applications are rolled out which result in additional network utilization requiring additional network capacity. For example, an addition of an enterprise resource planning system (e.g., such as an ERP system R/3 sold by SAP) frequently results in a significant increase of network utilization and thus requires an expansion of network capacity. Meeting such a demand for additional network capacity within a global enterprise network is further complicated by differing logistics, service arrangements, and lag times for provisioning network capacity in each region or country.

Another complication of managing network capacity involves a need to balance between delivering an acceptable response time for applications operating via networks and avoiding a waste of working capital. As network capacity increases, users of networks may experience a faster application response time. Nevertheless, without careful forecasting and planning, increasing network capacity to achieve faster application response time often results in over-provisioning of network capacity, which may waste network resources and increase costs for maintaining networks.

Accordingly, there is a need for systems and methods that provide advance information regarding future user demand for networks so that appropriate planning to expand or reduce network capacity is possible. There is also a need for systems and methods that predict network capacity requirements so that networks may remain adequate and efficiently utilized with respect to increased or decreased network usage. In addition, there is a need for systems and methods that anticipate a need for improved application performance in networks without over-provisioning of network capacity resulting in wasted working capital.

BRIEF SUMMARY OF THE INVENTION

In order to solve these and other needs in the art, the inventors hereof have succeeded at designing systems and methods for maintaining a capacity of a network and anticipating demand for the network. Embodiments of the present invention effectively utilize data representative of a present network capacity, present user demand, and current network utilization to forecast network requirements at a future point in time. Embodiments of the invention also advantageously allow prompt purchase and installation of additional network capacity in order to accommodate increased user demand for the network. Additionally, embodiments of the invention advantageously allow evaluation of network utilization and user demand to remove over-provisioned network capacity and to avoid wasting of working capital.

In one form, the invention is a method of maintaining capacity of a network. Future times are defined at which a capacity of the network is evaluated. A total capacity of the network (TNC) at each of the future times is determined. A total demand of users (TUD) for the network at each of the future times is determined. A predicted utilization (PU) of the network is determined at each of the future times as a function of the total demand of users (TUD) and the total capacity of the network (TNC). An acceptable utilization of the network at each of the future times is defined. The predicted utilization (PU) of the network is compared to the acceptable utilization of the network at each of the future times. In response to the comparing, for each future time, a change in network capacity (DCNC) to be applied to the network in order to increase or decrease the capacity of the network is determined.

In another form, the invention is a system to maintain capacity of a network. The system includes comprises computer-executable instructions to:
  define future times at which a capacity of the network is evaluated;
  determine a total capacity of the network (TNC) at each of the future times;
  determine a total demand of users (TUD) for the network at each of the future times;
  determine a predicted utilization (PU) of the network at each of the future times as a function of the total demand of users (TUD) and the total capacity of the network (TNC);
  define an acceptable utilization of the network at each of the future times;
  compare the predicted utilization (PU) of the network to the acceptable utilization of the network at each of the future times; and
  determine, for each future time, a change in network capacity (DCNC) to be applied to the network in order to increase or decrease the capacity of the network.

In another form, the invention is a computer-readable medium having computer-executable instructions to perform a method to maintain capacity of a network. The method comprises:
  defining future times at which a capacity of the network is evaluated;
  determining a total capacity of the network (TNC) at each of the future times;
  determining a total demand of users (TUD) for the network at each of the future times;
  determining a predicted utilization (PU) of the network at each of the future times as a function of the total demand of users (TUD) and the total capacity of the network (TNC);
  defining an acceptable utilization of the network at each of the future times;
  comparing the predicted utilization (PU) of the network to the acceptable utilization of the network at each of the future times; and
  determining in response to the comparing, for each future time, a change in network capacity (DCNC) to be applied to the network in order to increase or decrease the capacity of the network.

Alternatively, the invention may comprise various other methods and apparatuses.

Other features will be in part apparent and in part pointed out hereinafter.

BRIEF DESCRIPTION OF THE DRAWINGS AND TABLES

TABLE 1 illustrates variations in a predicted utilization of a network as user demand for the network changes over time without any determined change in network capacity.

TABLE 2 corresponds to TABLE 1 and illustrates calculating a determined change in network capacity to compensate a change in user demand for the network.

TABLE 3 corresponds to TABLE 2 and illustrates implementation of embodiments of the invention such that a determined change in network capacity is applied to a network to maintain an adjusted predicted utilization at a level between a minimum acceptable utilization and a maximum acceptable utilization.

Corresponding reference characters indicate corresponding parts throughout the drawings.

Definitions

Within the context of this specification, each term or phrase below will include, but will not be considered necessarily limited to, the following meaning or meanings.

PRESENT NETWORK CAPACITY (PNC) is an objective measure of an existing network capacity. For example, PRESENT NETWORK CAPACITY (PNC) may be a sum of an amount of data capable of being transmitted via the network within a period of time (i.e., a data transmission rate). An exemplary PRESENT NETWORK CAPACITY (PNC) for Time 0 (T0) to Time 8 (T8) is indicated in boxes C2-K2 of TABLES 1, 2, and 3.

PLANNED CHANGE IN NETWORK CAPACITY (PCNC) is the same objective measure as PRESENT NETWORK CAPACITY (PNC) and indicates an amount of network capacity planned to be added to or removed from an existing network due to anticipated or planned modifications to the network. PLANNED CHANGE IN NETWORK CAPACITY (PCNC) may be positive or negative depending on whether the network capacity increases or decreases. An exemplary PLANNED CHANGE IN NETWORK CAPACITY (PCNC) for T0 to T8 is indicated in boxes C3-K3 of TABLES 1, 2, and 3.

TOTAL NETWORK CAPACITY (TNC=PNC+PCNC) is a sum of PRESENT NETWORK CAPACITY (PNC) and PLANNED CHANGE IN NETWORK CAPACITY (PCNC) and indicates a total anticipated network capacity after PLANNED CHANGE IN NETWORK CAPACITY (PCNC) is added to or removed from an existing network due to anticipated modifications. An exemplary TOTAL NETWORK CAPACITY (TNC) for T0 to T8 is indicated in boxes C4-K4 of TABLES 1, 2, and 3.

PRESENT USER DEMAND (PUD) is an amount indicative of a network capacity presently required by users of a network. An exemplary PRESENT USER DEMAND (PUD) for T0 to T8 is indicated in boxes C5-K5 of TABLES 1, 2, and 3.

CHANGE IN USER DEMAND (CUD) is an amount indicative of an anticipated change in network capacity that may be needed to meet specific events resulting in increased or decreased user demand for a network. CHANGE IN USER DEMAND (CUD) may be positive or negative depending on whether user demand for the network increases or decreases. An exemplary CHANGE IN USER DEMAND (CUD) for T0 to T8 is indicated in boxes C6-K6 of TABLES 1, 2, and 3.

TOTAL USER DEMAND (TUD=PUD+CUD) is a sum of PRESENT USER DEMAND (PUD) and CHANGE IN USER DEMAND (CUD) and indicates an anticipated network capacity that may be required by users of a network at a future point in time. An exemplary TOTAL USER DEMAND (TUD) for T0 to T8 is indicated in boxes C7-K7 of TABLES 1, 2, and 3.

PREDICTED UTILIZATION (PU=TUD/TNC) is TOTAL USER DEMAND (TUD) divided by TOTAL NETWORK CAPACITY (TNC) and is a predicted percent usage of a network capacity at a future point in time. An exemplary PREDICTED UTILIZATION (PU) for T0 to T8 is indicated in boxes C8-K8 of TABLES 1, 2, and 3.

MAXIMUM ACCEPTABLE UTILIZATION (MaxAU) is a preferred maximum percent usage of a network capacity. An exemplary MAXIMUM ACCEPTABLE UTILIZATION (MaxAU) for T0 to T8 is indicated in boxes C9-K9 of TABLES 1, 2, and 3.

MINIMUM ACCEPTABLE UTILIZATION (MinAU) is a preferred minimum percent usage of a network capacity. An exemplary MINIMUM ACCEPTABLE UTILIZATION (MinAU) for T0 to T8 is indicated in boxes C10-K10 of TABLES 1, 2, and 3.

CURRENT UTILIZATION (CU) is a current percent usage of a network capacity.

DETERMINED CHANGE IN NETWORK CAPACITY (DCNC) is an amount of network capacity that needs to be added to or removed from a network to accommodate an increase or decrease of user demand. DETERMINED CHANGE IN NETWORK CAPACITY (DCNC) may be positive or negative depending on whether the network capacity increases or decreases. An exemplary DETERMINED CHANGE IN NETWORK CAPACITY (DCNC) for T0 to T8 is indicated in boxes C11-K11 of TABLES 2 and 3.

ADJUSTED TOTAL NETWORK CAPACITY (ATNC=TNC+DCNC) is a sum of TOTAL NETWORK CAPACITY (TNC) and DETERMINED CHANGE IN NETWORK CAPACITY (DCNC) and indicates an adjusted total anticipated network capacity after DETERMINED CHANGE IN NETWORK CAPACITY (DCNC) is applied to a network. An exemplary TOTAL NETWORK CAPACITY (TNC) for T0 to T8 is indicated in boxes C12-K12 of TABLE 3.

ADJUSTED PREDICTED UTILIZATION (APU=TUC/ATNC) is TOTAL USER DEMAND (TUD) divided by ADJUSTED TOTAL NETWORK CAPACITY (ATNC) and is an adjusted predicted percent usage of a network capacity at a future point in time after DETERMINED CHANGE IN NETWORK CAPACITY (DCNC) is applied to a network. An exemplary ADJUSTED PREDICTED UTILIZATION (APU) for T0 to T8 is indicated in boxes C13-K13 of TABLE 3.

INSTALLATION indicates an amount of time (e.g., days) needed to install DETERMINED CHANGE IN NETWORK CAPACITY (DCNC).

ADVANCE PURCHASE indicates an amount of time (e.g., days) needed from purchase order to delivery of DETERMINED CHANGE IN NETWORK CAPACITY (DCNC).

LEAD TIME is a sum of INSTALLATION and ADVANCE PURCHASE.

These terms may be defined with additional language or by additional examples in the remaining portions of the specification, and also encompass their ordinary and customary meaning(s).

DETAILED DESCRIPTION OF THE INVENTION

Figure 1:
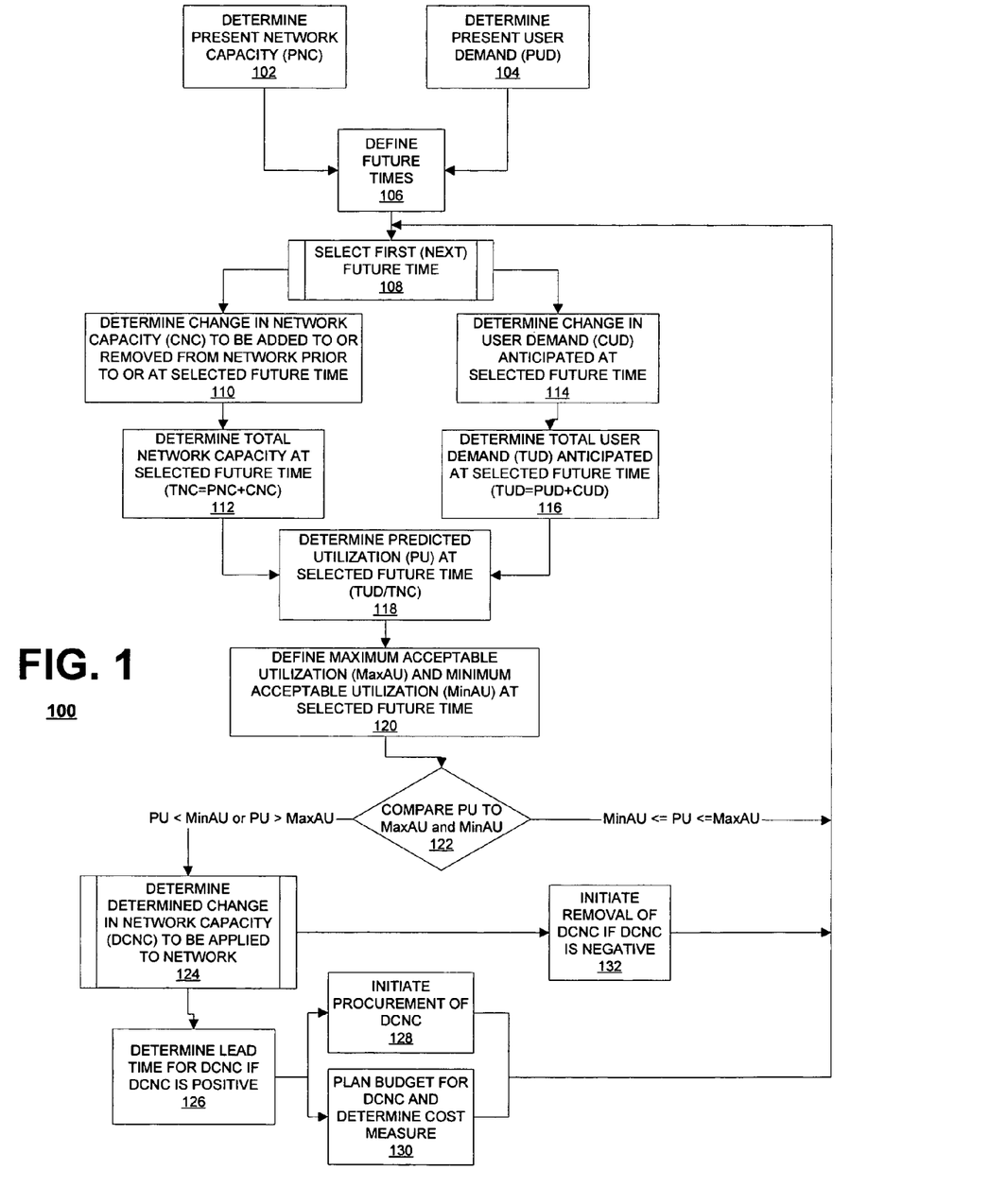
FIG. 1 is an exemplary diagram illustrating a process according to one embodiment of the invention for anticipating demand for a network and maintaining capacity of a network.

FIG. 1 illustrates generally one method (indicated generally by reference character 100) according to one embodiment of the invention for anticipating demand for a network and maintaining capacity of a network, which may be implemented manually or via software. At 102, method 100 determines a PRESENT NETWORK CAPACITY (PNC) of the network. The PRESENT NETWORK CAPACITY (PNC) generally indicates a present capacity of the network in handling a user demand for one or more applications operating via the network. According to one embodiment of the invention, the network may have either a fixed or a burstable capacity. A fixed capacity network maintains a substantially fixed bandwidth throughout data transmission. One example of a fixed capacity network is a dedicated T-1 line, which is capable of transmitting data at a substantially constant 1.544 megabits per second (Mbps). In the preferred embodiment of the invention, PRESENT NETWORK CAPACITY (PNC) for a fixed capacity network is the fixed bandwidth of the network. A burstable capacity network (e.g., Frame-Relay or asynchronous transfer mode (ATM) circuit), on the other hand, allows data transmission rate to exceed a predefined network bandwidth for a period of time. Preferably, method 100 may determine PRESENT NETWORK CAPACITY (PNC) of a burstable capacity network to be the network's predefined network bandwidth.

At 104, method 100 determines a PRESENT USER DEMAND (PUD) for the network. The PRESENT USER DEMAND (PUD) generally indicates an amount of network capacity presently required by users of the network. In general, as user demand for applications operating via the network increases, demand for the network capacity also increases. In other words, PRESENT USER DEMAND (PUD) may depend on how many users request data from an application operating via the network. If the application has a substantial number of users, then the network may require more network capacity to transmit application data to the users.

At 106, method 100 defines one or more future times at which the network capacity and user demand for the network are evaluated. In the preferred embodiment of the invention, each of the future times may be defined as a function of fixed time intervals. For example, the future times may be defined as a function of one-year intervals so that the network capacity and user demand for the network are annually evaluated. In an alternative embodiment of the invention, method 100 may define the futures times based on a particular type of network forecast desired. For example, to evaluate both shorter and longer projections of the network capacity and user demand, the future times may be defined as one month, six month, one year, and then two years from a present time. In addition, it is to be understood that the future times may be defined in any other manner as desired, such as anticipated times of growth. At 108, method 100 selects a first future time of the defined future times to begin evaluating the network capacity and user demand.

At 110, method 100 determines a PLANNED CHANGE IN NETWORK CAPACITY (PCNC) that may be added to or removed from the network between the present time and the future time selected at 108. The PLANNED CHANGE IN NETWORK CAPACITY (PCNC) generally reflects an increase or decrease of network capacity that will result from anticipated or planned modifications to the existing network. For example, a 5% increase of network capacity may be anticipated or planned for each of the future times. Proceeding to 112, method 100 determines a TOTAL NETWORK CAPACITY (TNC) of the network at the selected future time. According to one exemplary embodiment of the invention, method 100 derives the TOTAL NETWORK CAPACITY (TNC) by adding PRESENT NETWORK CAPACITY (PNC) and PLANNED CHANGE IN NETWORK CAPACITY (PCNC).

In one embodiment of the invention, method 100 determines at 114 a CHANGE IN USER DEMAND (CUD) for the network anticipated at the selected future time. The CHANGE IN USER DEMAND (CUD) generally indicates an increase or decrease of user demand for the network that may occur between the present time and the selected future time. Particularly, as a number of users accessing an application operating via the network changes, user demand for the network changes as well. For example, user demand for the network may increase after a new application or a newer version of an application is rolled out to clients coupled to the network. In contrast, loss of users for an application may result in decreased user demand for the network. Accordingly, CHANGE IN USER DEMAND (CUD) may indicate either a growth or shrinking of PRESENT USER DEMAND (PUD).

Proceeding to 116, method 100 determines a TOTAL USER DEMAND (TUD) anticipated at the selected future time. In one exemplary embodiment of the invention, the TOTAL USER DEMAND (TUD) is determined by summing PRESENT USER DEMAND (PUD) and CHANGE IN USER DEMAND (CUD). In general, TOTAL USER DEMAND (TUD) indicates an anticipated network capacity required by users of applications operating via the network at the selected future time.

According to one embodiment of the invention, method 100 determines at 118 a PREDICTED UTILIZATION (PU) of the network at the selected future time. The PREDICTED UTILIZATION (PU) generally indicates how much network capacity users are likely to utilize at the selected future time. In one exemplary embodiment of the invention, PREDICTED UTILIZATION (PU) indicates a percentage of network usage (i.e., percent usage) at the selected future time and is calculated as TOTAL USER DEMAND (TUD) divided by TOTAL NETWORK CAPACITY (TNC).

At 120, method 100 may define a MAXIMUM ACCEPTABLE UTILIZATION (MaxAU) of the network at the selected future time. In one embodiment of the invention, the MAXIMUM ACCEPTABLE UTILIZATION (MaxAU) generally indicates a percentage representative of a preferred maximum usage of the network capacity (e.g., 85% of the network capacity). In another embodiment of the invention, method 100 may specify multiple levels of MAXIMUM ACCEPTABLE UTILIZATION (MaxAU) to designate degrees of network utilization preferences. For example, method 100 may specify a first level of MAXIMUM ACCEPTABLE UTILIZATION (MaxAU) at 70% of the network capacity and a second level of MAXIMUM ACCEPT- ABLE UTILIZATION (MaxAU) at 85% of the network capacity. In this particular example, a network usage below the first level may indicate that the network can effectively accommodate user demand. A network usage above the first level but below the second level may indicate that the network is having difficulty in accommodating user demand and thus a further analysis of the network utilization is warranted. Furthermore, in this example, a network usage above the second level may indicate that the network is over-utilized such that managers of the network may need to expand the network capacity.

According to one embodiment of the invention, method 100 may also define a MINIMUM ACCEPTABLE UTILIZATION (MinAU), which generally indicates a percentage representative of a preferred minimum usage of the network capacity. For example, method 100 may define the MINIMUM ACCEPTABLE UTILIZATION (MinAU) to be 30% of the network capacity. Therefore, according to this particular example, if users utilize less than 30% of the network capacity, managers of the network may consider reducing the network capacity to minimize costs for maintaining the network and avoid wasted working capital (e.g., by reducing idle network capacity).

Proceeding to 122, method 100 compares PREDICTED UTILIZATION (PU) at the selected future time with both MINIMUM ACCEPTABLE UTILIZATION (MinAU) and MAXIMUM ACCEPTABLE UTILIZATION (MaxAU). According to one exemplary embodiment of the invention, if PREDICTED UTILIZATION (PU) is at a level between MINIMUM ACCEPTABLE UTILIZATION (MinAU) and MAXIMUM ACCEPTABLE UTILIZATION (MaxAU), then the predicted network usage at the selected future time is at a preferred level and no increase or decrease of the network capacity is needed to meet anticipated changes in user demand. Accordingly, method 100 may return to 108 to select a next defined future time to be evaluated, until every one of the defined future times has been selected.

According to another exemplary embodiment of the invention, if PREDICTED UTILIZATION (PU) is less than MINIMUM ACCEPTABLE UTILIZATION (MinAU), then the network may be over-provisioned given the level of user demand at the selected future time. In such a scenario, a reduction of the network capacity may be warranted. In contrast, if PREDICTED UTILIZATION (PU) is greater than MAXIMUM ACCEPTABLE UTILIZATION (MaxAU), then the network may not have adequate capacity to accommodate user demand at the selected future time. In both scenarios, method 100 may determine a DETERMINED CHANGE IN NETWORK CAPACITY (DCNC) for the network at 124. The DETERMINED CHANGE IN NETWORK CAPACITY (DCNC) generally indicates an amount of network capacity that needs to be added to or removed from the network in order for an ADJUSTED PREDICTED UTILIZATION (APU) of the network to be at a level between MINIMUM ACCEPTABLE UTILIZATION (MinAU) and MAXIMUM ACCEPTABLE UTILIZATION (MaxAU) at the selected future time. According to an embodiment, DETERMINED CHANGE IN NETWORK CAPACITY (DCNC) may be either positive or negative depending if network capacity needs to be added to or removed from the network.

In the scenario that DETERMINED CHANGE IN NETWORK CAPACITY (DCNC) is positive (i.e., network capacity needs to be added to the network), method 100 may determine at 126 a LEAD TIME for DETERMINED CHANGE IN NETWORK CAPACITY (DCNC). In general, the LEAD TIME is a sum of an ADVANCE PURCHASE and an INSTALLATION and indicates an amount of time needed for delivery and installation of purchased DETERMINED CHANGE IN NETWORK CAPACITY (DCNC). For example, if the time to deliver purchased DETERMINED CHANGE IN NETWORK CAPACITY (DCNC) is one month (i.e., ADVANCE PURCHASE) and the time to install DETERMINED CHANGE IN NETWORK CAPACITY (DCNC) is another month (i.e., INSTALLATION), then LEAD TIME may be two months. According to this particular example and at 128, method 100 may initiate procurement of DETERMINED CHANGE IN NETWORK CAPACITY (DCNC) (e.g., by placing a purchase order) at least two months prior to the selected future time in order to have DETERMINED CHANGE IN NETWORK CAPACITY (DCNC) installed at the selected future time to accommodate user demand for the network. The method 100 then returns to 108 to select the next defined future time.

According to one embodiment of the invention, in the scenario that DETERMINED CHANGE IN NETWORK CAPACITY (DCNC) is positive, method 100 may also plan a budget for DETERMINED CHANGE IN NETWORK CAPACITY (DCNC), as indicated at 130. In particular, method 100 may determine a projected cost measure of DETERMINED CHANGE IN NETWORK CAPACITY (DCNC) (e.g., in unit cost and/or total cost) in order to facilitate budged planning for future expansion of the network capacity. In one exemplary embodiment of the invention, method 100 may project a unit cost of DETERMINED CHANGE IN NETWORK CAPACITY (DCNC) (e.g., cost per kilobit) at a future time by analyzing past trends of unit cost increases or decreases for networks with a similar size, distance, and location (i.e., unit cost may vary according to network size, link distance, and region/country of network). Using the projected unit cost of DETERMINED CHANGE IN NETWORK CAPACITY (DCNC), method 100 may calculate a projected total cost of DETERMINED CHANGE IN NETWORK CAPACITY (DCNC) at the future time. Alternatively, method 100 may multiply a current unit cost of network capacity by DETERMINED CHANGE IN NETWORK CAPACITY (DCNC) to derive the projected total cost of DETERMINED CHANGE IN NETWORK CAPACITY (DCNC) without analyzing past trends of unit cost increases or decreases. This embodiment of the invention advantageously allows managers of the network to examine financial viability of network capacity procurement.

In the scenario that DETERMINED CHANGE IN NETWORK CAPACITY (DCNC) is negative (i.e., network capacity needs to be removed from the network), method 100 may initiate removal of DETERMINED CHANGE IN NETWORK CAPACITY (DCNC) from the network 128 so that the ADJUSTED PREDICTED UTILIZATION (APU) may be greater than or equal to MINIMUM ACCEPTABLE UTILIZATION (MinAU) before or at the selected future time, as indicated at 132. The method 100 then returns to 108 to select the next defined future time.

It is to be understood that the illustrated order of method 100 is for illustration purpose only. Accordingly, method 100 does not require any defined order of steps. It is contemplated that any particular step of method 100 may be performed before, contemporaneously with, or after another step without changing the scope of the invention.

TABLE 1

|  |  | T0 | T1 | T2 | T3 | T4 | T5 | T6 | T7 | T8 |
|---|---|---|---|---|---|---|---|---|---|---|
| PNC | PRESENT NETWORK CAPACITY | 400 | 400 | 400 | 440 | 440 | 484 | 484 | 532 | 532 |
| PCNC | PLANNED CHANGE IN NETWORK CAPACITY | 0 | 0 | 40 | 0 | 44 | 0 | 48 | 0 | 53 |
| TNC = PNC + PCNC | TOTAL NETWORK CAPACITY | 400 | 400 | 440 | 440 | 484 | 484 | 532 | 532 | 585 |
| PUD | PRESENT USER DEMAND | 340 | 340 | 320 | 110 | 90 | 120 | 420 | 460 | 500 |
| CUD | CHANGE IN USER DEMAND | 0 | −20 | −210 | −20 | 30 | 300 | 40 | 40 | 20 |
| TUD = PUD + CUD | TOTAL USER DEMAND | 340 | 320 | 110 | 90 | 120 | 420 | 460 | 500 | 520 |
| PU = TUD/TNC | PREDICTED UTILIZATION | 85% | 80% | 25% | 20% | 25% | 87% | 86% | 94% | 89% |
| MaxAU varies | MAXIMUM ACCEPTABLE UTILIZATION | 85% | 85% | 85% | 85% | 85% | 80% | 80% | 75% | 70% |
| MinAU varies | MINIMUM ACCEPTABLE UTILIZATION | 30% | 30% | 30% | 30% | 30% | 35% | 35% | 40% | 45% |

TABLE 1 illustrates variations in PREDICTED UTILIZATION (PU) of the network as TOTAL USER DEMAND (TUD) changes over time without any corresponding DETERMINED CHANGE IN NETWORK CAPACITY (DCNC). As can be seen in TABLE 1, there is a positive PLANNED CHANGE IN NETWORK CAPACITY (PCNC) of 10% in T2, T4, T6, and T8. As a result, TOTAL NETWORK CAPACITY (TNC) is anticipated to increase by 10% in T2, T4, T6, and T8. Nevertheless, CHANGE IN USER DEMAND (CUD), and as a result, TOTAL USER DEMAND (TUD), for the network also varies throughout T0 to T8. Without any DETERMINED CHANGE IN NETWORK CAPACITY (DCNC) added to or removed from the network, PREDICTED UTILIZATION (PU) at a particular future time may fall below MINIMUM ACCEPTABLE UTILIZATION (MinAU) or rise above MAXIMUM ACCEPTABLE UTILIZATION (MaxAU). For example, at T2, a CHANGE IN USER DEMAND (CUD) of −210 (and thus a TOTAL USER DEMAND (TUD) of 110) causes PREDICTED UTILIZATION (PU) to fall to 25%, which is below the MINIMUM ACCEPTABLE UTILIZATION (MinAU) of 30%. In another example, at T7, a CHANGE IN USER DEMAND (CUD) of +40 (and thus a TOTAL USER DEMAND (TUD) of 500) causes PREDICTED UTILIZATION (PU) to rise to 94%, which is above the MAXIMUM ACCEPTABLE UTILIZATION (MaxAU) of 75%. It is noted that MAXIMUM ACCEPTABLE UTILIZATION (MaxAU) and MINIMUM ACCEPTABLE UTILIZATION (MinAU) vary across T0 to T8 to reflect a preferred network utilization at a particular future point in time.

TABLE 2

|  |  | T0 | T1 | T2 | T3 | T4 | T5 | T6 | T7 | T8 |
|---|---|---|---|---|---|---|---|---|---|---|
| PNC | PRESENT NETWORK CAPACITY | 400 | 400 | 400 | 440 | 440 | 484 | 484 | 532 | 532 |
| PCNC | PLANNED CHANGE IN NETWORK CAPACITY | 0 | 0 | 40 | 0 | 44 | 0 | 48 | 0 | 53 |
| TNC = PNC + PCNC | TOTAL NETWORK CAPACITY | 400 | 400 | 440 | 440 | 484 | 484 | 532 | 532 | 585 |
| PUD | PRESENT USER DEMAND | 340 | 340 | 320 | 110 | 90 | 120 | 420 | 460 | 500 |
| CUD | CHANGE IN USER DEMAND | 0 | −20 | −210 | −20 | 30 | 300 | 40 | 40 | 20 |
| TUD = PUD + CUD | TOTAL USER DEMAND | 340 | 320 | 110 | 90 | 120 | 420 | 460 | 500 | 520 |
| PU = TUD/ | PREDICTED | 85% | 80% | 25% | 20% | 25% | 87% | 86% | 94% | 89% |

TABLE 2-continued

|  |  | T0 | T1 | T2 | T3 | T4 | T5 | T6 | T7 | T8 |
|---|---|---|---|---|---|---|---|---|---|---|
| TNC |  |  |  |  |  |  |  |  |  |  |
| MaxAU varies | UTILIZATION MAXIMUM ACCEPTABLE UTILIZATION | 85% | 85% | 85% | 85% | 85% | 80% | 80% | 75% | 70% |
| MinAU varies | MINIMUM ACCEPTABLE UTILIZATION | 30% | 30% | 30% | 30% | 30% | 35% | 35% | 40% | 45% |
| DCNC | DETERMINED CHANGE IN NETWORK CAPACITY | 0 | 0 | −73 | −140 | −84 | 41 | 43 | 135 | 158 |

TABLE 2 similarly illustrates variations in PREDICTED UTILIZATION (PU) of the network from T0 to T8 but now calculates corresponding DETERMINED CHANGES IN NETWORK CAPACITY (DCNC). In TABLE 2, a DETERMINED CHANGE IN NETWORK CAPACITY (DCNC) is separately calculated for each future time to compensate a change in TOTAL USER DEMAND (TUD) at the same future time. In particular, according to an embodiment of the invention, the DETERMINED CHANGE IN NETWORK CAPACITY (DCNC) is calculated as an amount of TOTAL NETWORK CAPACITY (TNC) increase or decrease such that PREDICTED UTILIZATION (PU) of the network at a particular future time is increased or decreased to a level between MINIMUM ACCEPTABLE UTILIZATION (MinAU) and MAXIMUM ACCEPTABLE UTILIZATION (MaxAU). As one example, at T2, a DETERMINED CHANGE IN NETWORK CAPACITY (DCNC) of −73 is needed to compensate a CHANGE IN USER DEMAND (CUD) of −210. Similarly, at T7, a DETERMINED CHANGE IN NETWORK CAPACITY (DCNC) of +135 is needed to compensate a CHANGE IN USER DEMAND (CUD) of +40. In contrast, at T1, since PREDICTED UTILIZATION (PU) is at a level between MINIMUM ACCEPTABLE UTILIZATION (MaxAU) and MINIMUM ACCEPTABLE UTILIZATION (MinAU), no DETERMINED CHANGE IN NETWORK CAPACITY (DCNC) needs to be added to or removed from the network to accommodate increased or decreased user demand. It is noted that in TABLE 2, even though a DETERMINED CHANGE IN NETWORK CAPACITY (DCNC) is calculated for each future time, the DETERMINED CHANGE IN NETWORK CAPACITY (DCNC) is not added to or removed from the network. Accordingly, in TABLE 2, the PRESENT NETWORK CAPACITY (PNC) at each future time does not take into account the DETERMINED CHANGE IN NETWORK CAPACITY (DCNC) of the previous future time.

TABLE 3

|  |  | T0 | T1 | T2 | T3 | T4 | T5 | T6 | T7 | T8 |
|---|---|---|---|---|---|---|---|---|---|---|
| PNC | PRESENT NETWORK CAPACITY | 400 | 400 | 400 | 367 | 300 | 344 | 525 | 573 | 667 |
| PCNC | PLANNED CHANGE IN NETWORK CAPACITY | 0 | 0 | 40 | 0 | 44 | 0 | 48 | 0 | 53 |
| TNC = PNC + PCNC | TOTAL NETWORK CAPACITY | 400 | 400 | 440 | 367 | 344 | 344 | 573 | 573 | 720 |
| PUD | PRESENT USER DEMAND | 340 | 340 | 320 | 110 | 90 | 120 | 420 | 460 | 500 |
| CUD | CHANGE IN USER DEMAND | 0 | −20 | −210 | −20 | 30 | 300 | 40 | 40 | 20 |
| TUD = PUD + CUD | TOTAL USER DEMAND | 340 | 320 | 110 | 90 | 120 | 420 | 460 | 500 | 520 |
| PU = TUD/TNC | PREDICTED UTILIZATION | 85% | 80% | 25% | 25% | 35% | 122% | 80% | 87% | 72% |
| MaxAU varies | MAXIMUM ACCEPTABLE UTILIZATION | 85% | 85% | 85% | 85% | 85% | 80% | 80% | 75% | 70% |
| MinAU varies | MINIMUM ACCEPTABLE UTILIZATION | 30% | 30% | 30% | 30% | 30% | 35% | 35% | 40% | 45% |
| DCNC | DETERMINED CHANGE IN NETWORK CAPACITY | 0 | 0 | −73 | −67 | 0 | 181 | 0 | 94 | 23 |
| ATNC = TNC + DCNC | ADJUSTED | 400 | 400 | 367 | 300 | 344 | 525 | 573 | 667 | 743 |

TABLE 3-continued

|  |  | T0 | T1 | T2 | T3 | T4 | T5 | T6 | T7 | T8 |
|---|---|---|---|---|---|---|---|---|---|---|
| APU = TUD/ATNC | TOTAL NETWORK CAPACITY ADJUSTED PREDICTED UTILIZATION | 85% | 80% | 30% | 30% | 35% | 80% | 80% | 75% | 70% |

TABLE 3 corresponds to TABLE 2 and illustrates implementation of embodiments of the invention. Specifically, a DETERMINED CHANGE IN NETWORK CAPACITY (DCNC) will be applied to the network at each future time to maintain an ADJUSTED PREDICTED UTILIZATION (APU) of the network at a level between MINIMUM ACCEPTABLE UTILIZATION (MinAU) and MAXIMUM ACCEPTABLE UTILIZATION (MaxAU). For example, at T2, a DETERMINED CHANGE IN NETWORK CAPACITY (DCNC) of −73 is needed to compensate a CHANGE IN USER DEMAND (CUD) of −210. After removing the DETERMINED CHANGE IN NETWORK CAPACITY (DCNC) from the network at T2, TOTAL NETWORK CAPACITY (TNC) is adjusted to become an ADJUSTED TOTAL NETWORK CAPACITY (ATNC) of 367 (i.e., 440-73). As such, PREDICTED UTILIZATION (PU) of the network is adjusted to become an ADJUSTED PREDICTED UTILIZATION (APU) of 30% (i.e., 110/367) at T2, which is at a level between MINIMUM ACCEPTABLE UTILIZATION (MinAU) and MAXIMUM ACCEPTABLE UTILIZATION (MaxAU).

Also can be seen in TABLE 3, after a DETERMINED CHANGE IN NETWORK CAPACITY (DCNC) is applied to the network at a particular future time, PRESENT NETWORK CAPACITY (PNC) of the next future time reflects the applied DETERMINED CHANGE IN NETWORK CAPACITY (DCNC). For example, ADJUSTED TOTAL NETWORK CAPACITY (ATNC) of T2 is carried over to be PRESENT NETWORK CAPACITY (PNC) of T3; ADJUSTED TOTAL NETWORK CAPACITY (ATNC) of T3 is carried over to be PRESENT NETWORK CAPACITY (PNC) of T4; and so on. Therefore, according to the embodiment of the invention illustrated in TABLE 3, the network capacity changes as PLANNED CHANGE IN NETWORK CAPACITY (PCNC) and DETERMINED CHANGE IN NETWORK CAPACITY (DCNC) are applied to the network. As such, determining a PREDICTED UTILIZATION (PU) at a particular future time includes taking into account both the PLANNED CHANGE IN NETWORK CAPACITY (PCNC) and DETERMINED CHANGE IN NETWORK CAPACITY (DCNC).

Figure 2:
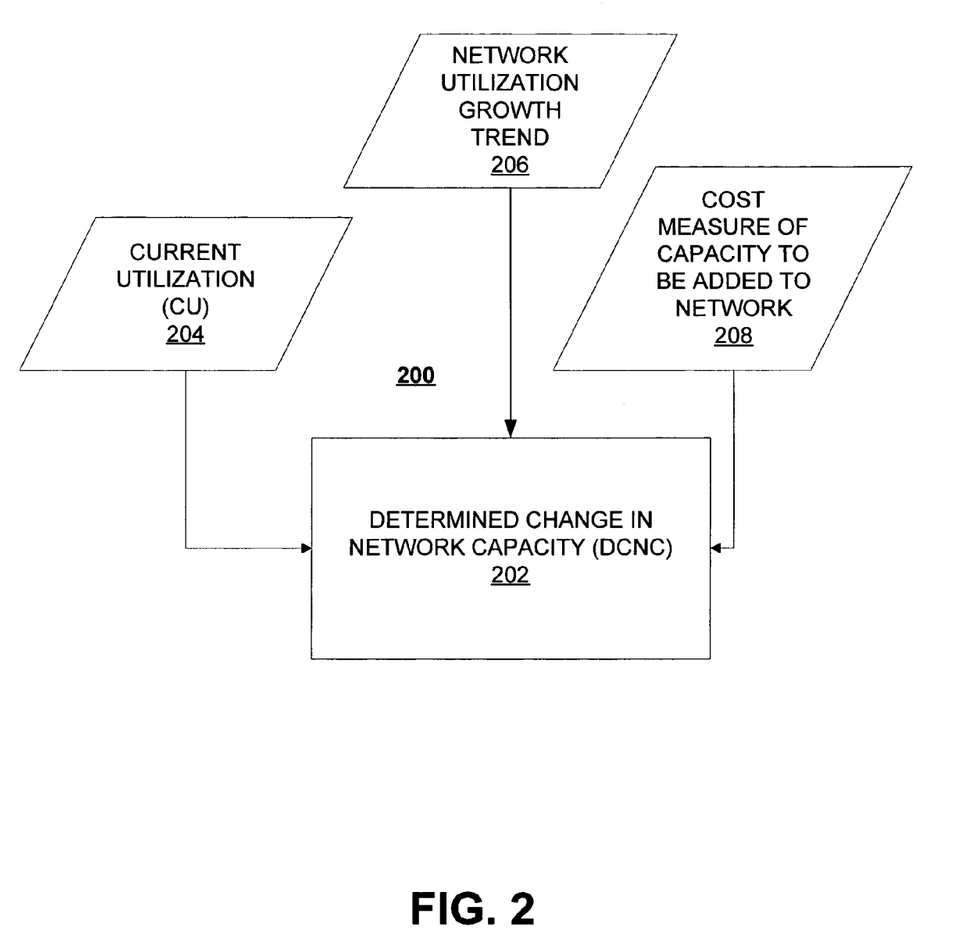
FIG. 2 is an exemplary diagram illustrating a process according to one embodiment of the invention for determining a change in network capacity to be applied to a network.

FIG. 2 illustrates generally a method 200 according to one embodiment of the invention for determining a DETERMINED CHANGE IN NETWORK CAPACITY (DCNC). According to an exemplary embodiment of the invention, at 202, the method 200 may consider various factors in determining the DETERMINED CHANGE IN NETWORK CAPACITY (DCNC), including: a CURRENT UTILIZATION (CU) of the network at 204, a network utilization growth trend at 206, and a cost measure of capacity to be added to the network at 208. In general, the CURRENT UTILIZATION (CU) of the network is an indication of how users are currently utilizing the network. In one embodiment of the invention, method 200 may collect data samples over a period of time indicating how much network capacity users of the network are utilizing.

According to the preferred embodiment of the invention, method 200 may evaluate CURRENT UTILIZATION (CU) of the network based on percentiles of network usage. In one form, a percentile of network usage indicates a highest percent usage of the network capacity for a particular percentage of time. For example, a 75% network usage at 95th percentile indicates that for 95% of the time, users are utilizing less than 75% of the network capacity.

The method 200 may use percentile-based CURRENT UTILIZATION (CU) to determine DETERMINED CHANGE IN NETWORK CAPACITY (DCNC) at 202. If CURRENT UTILIZATION (CU) of the network across a range of percentiles substantially remains within a level between MINIMUM ACCEPTABLE UTILIZATION (MinAU) and MAXIMUM ACCEPTABLE UTILIZATION (MaxAU), then method 200 may determine that there is no DETERMINED CHANGE IN NETWORK CAPACITY (DCNC). This may be the case even if at a higher percentile (e.g., 99th percentile) or at a lower percentile (e.g., 30th percentile), CURRENT UTILIZATION (CU) rises above MAXIMUM ACCEPTABLE UTILIZATION (MaxAU) or falls below MINIMUM ACCEPTABLE UTILIZATION (MinAU), respectively. Such infrequent over-utilization or under-utilization of the network may not warrant an increase or decrease in the network capacity, since the network may accommodate user demand for a majority of time.

In contrast, if CURRENT UTILIZATION (CU) of the network remains above MAXIMUM ACCEPTABLE UTILIZATION (MaxAU) of below MINIMUM ACCEPTABLE UTILIZATION (MinAU) across a range of percentiles (e.g., from 30th percentile to 99th percentile), method 200 may determine a positive or negative DETERMINED CHANGE IN NETWORK CAPACITY (DCNC). Such frequent over-utilization or under-utilization of the network generally indicates that the network capacity needs to be increased or decreased in order to accommodate increased user demand or to avoid wasted network resources.

According to one embodiment of the invention, the network utilization growth trend as indicated at 206 is another factor in determining DETERMINED CHANGE IN NETWORK CAPACITY (DCNC). Based on the determined CURRENT UTILIZATION (CU) of the network and/or past growth of the network utilization, method 200 may project a growth trend of the network utilization. In one exemplary embodiment of the invention, method 200 may plot data samples representative of past utilizations of the network against time. By determining a regression of the plotted data samples, method 200 may estimate a future utilization of the network at a plurality of future points in time and thus may determine an estimated network utilization growth trend. If the estimated network utilization growth trend projects a higher network utilization at a particular future point in time, then a positive DETERMINED CHANGE IN NETWORK CAPACITY (DCNC) may be needed to meet an increased user demand for the network. If the estimated network growth trend projects a lower network utilization at a particular future point in time, then method 200 may determine a negative DETERMINED CHANGE IN NETWORK CAPACITY (DCNC) so that the network capacity at the particular future point in time is reduced to avoid wasted working capital.

The cost measure of capacity to be added to the network, as indicated at 208, may be another factor in determining DETERMINED CHANGE IN NETWORK CAPACITY (DCNC). For example, if the unit cost of network capacity and the resulting total cost are greater than a planned budget for adding capacity to the network, then method 200 may determine that the benefit of additional capacity is outweighed by the excess costs. On the other hand, if the unit cost of network capacity and the resulting total cost are within the planned budget, method 200 may determine a positive DETERMINED CHANGE IN NETWORK CAPACITY (DCNC), even if the network may accommodate current and projected user demand without additional network capacity. Purchasing or keeping inexpensive network capacity may advantageously allow network managers to sustain unanticipated future user demand for the network without incurring substantial costs.

Figure 3:
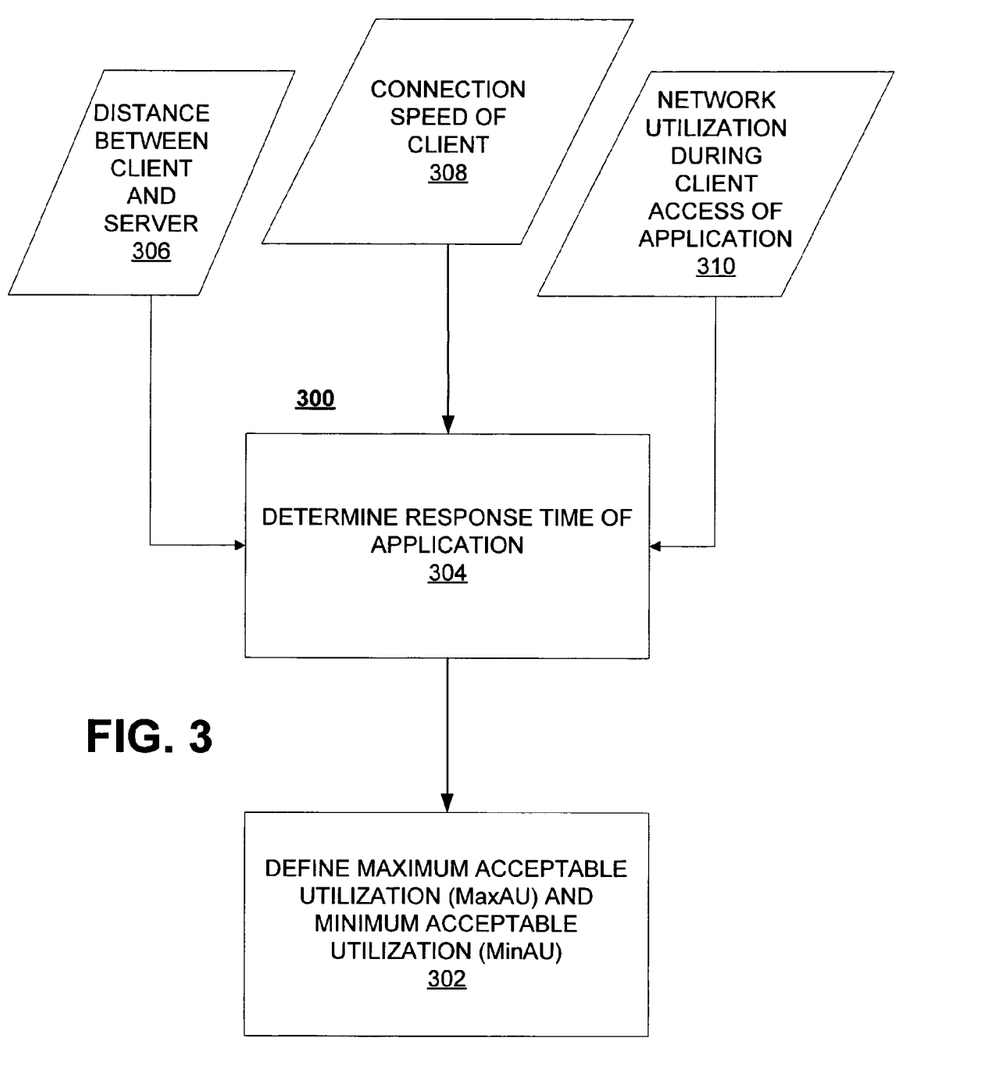
FIG. 3 is an exemplary diagram illustrating a process according to one embodiment of the invention for defining a maximum acceptable utilization and a minimum acceptable utilization of a network at a future point in time.

FIG. 3 illustrates generally a method 300 according to one embodiment of the invention for defining a MAXIMUM ACCEPTABLE UTILIZATION (MaxAU) and a MINIMUM ACCEPTABLE UTILIZATION (MinAU) of the network. According to one exemplary embodiment of the invention, the method 300 defines MAXIMUM ACCEPTABLE UTILIZATION (MaxAU) and MINIMUM ACCEPTABLE UTILIZATION (MinAU) of the network at 302 as a function of a response time of an application operating via the network, as indicated at 304. In general, response time of an application is directly impacted by the time needed to transmit data over the network. Thus, it is desirable to minimize response time in order to enhance the user's experience of the application. According to the preferred embodiment of the invention, method 300 may define MAXIMUM ACCEPTABLE UTILIZATION (MaxAU) such that the network would not be over-utilized to affect substantially a response time of an application operating via the network. Preferably, method 300 may also define a target response time so that MAXIMUM ACCEPTABLE UTILIZATION (MaxAU) is defined as the highest network utilization that would result in the target response time. In addition, method 300 may define MINIMUM ACCEPTABLE UTILIZATION (MinAU) at a level where no substantial reduction in response time would result from further reduction of network utilization.

In one exemplary embodiment of the invention, a response time of an application operating via the network may be based on a number of factors. As indicated at 306, the response time may depend on a distance between a client and a server of the application operating via the network. Generally, the distance between the client and the server is proportional to the response time of the application (e.g., the longer the distance, the longer the response time). Thus, method 300 may consider a weighted distance between the server and each client to determine an approximate response time of the application.

At 308, method 300 may also consider a connection speed of a client coupled to the network in determining the response time of the application. Clients with faster network connections are able to receive application data faster than clients with slower network connections. For example, clients coupled to the network via broadband (e.g., Digital Subscriber Line (DSL), cable modem, etc.) operating at a speed of 128 Kbps or higher may experience faster response times than clients coupled to the network via dial-up modem, which operates at a speed of 56 Kbps or lower. Accordingly, the network may be able to maintain a faster response time if clients of the application are coupled to the network via a faster network connection.

Network utilization during a period of time at which a client accesses the application may also affect the response time of the application, as indicated at 310. For example, during busy hours of network traffic (e.g., during working hours), a network serialization delay may result from higher network utilization and queuing of user demands. Such a network serialization delay may increase the response time of the application. According to one embodiment of the invention, method 300 may evaluate a frequency of network serialization delay (e.g., by using percentile-based network utilization data) to determine the application response time at particular time intervals (e.g., 12 pm to 5 pm, 5 pm to 10 pm, 10 pm to 12 am, etc.). In this embodiment of the invention, method 300 may define MAXIMUM ACCEPTABLE UTILIZATION (MaxAU) at a level such that infrequent long response time is tolerable but frequent long response time is intolerable.

Figure 4:
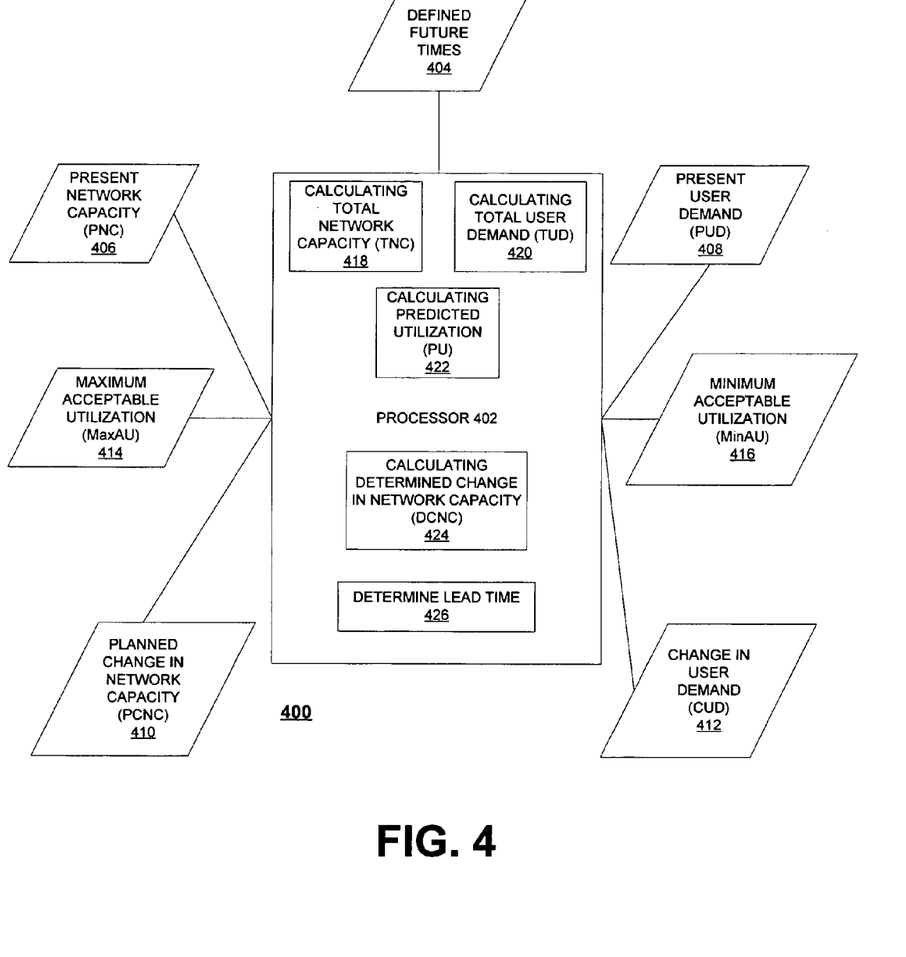
FIG. 4 is a diagram of an exemplary embodiment of a system according to one embodiment of the invention adapted to anticipate demand for a network and to maintain capacity of a network.

FIG. 4 illustrates generally a system 400 according to one exemplary embodiment of the invention adapted to anticipate demand for a network and to maintain capacity of a network. The system 400 includes a processor 402, which may be any type of general purpose or special purpose computing systems, environments, or configurations. Examples of well known computing systems, environments, and configurations that may be suitable for the processor 402 include, without limitation, personal computers, server computers, hand-held or laptop devices, multiprocessor systems, microprocessor-based systems, set top boxes, programmable consumer electronics, network personal computers, minicomputers, mainframe computers, distributed computing environments that include any of the above systems or devices, and the like.

As illustrated in FIG. 4, processor 402 includes computer-executable instructions to receive a number of inputs. At 404, processor 402 may include instructions to receive one or more future times at which the network capacity, network utilization, and user demand are evaluated. Processor 402 may also include instructions to receive a PRESENT NETWORK CAPACITY (PNC) at 406, a PRESENT USER DEMAND (PUD) at 408, a PLANNED CHANGE IN NETWORK CAPACITY (PCNC) at 410, and a CHANGE IN USER DEMAND (CUD) at 412. A MAXIMUM ACCEPTABLE UTILIZATION (MaxAU) and a MINIMUM ACCEPTABLE UTILIZATION (MinAU) may also be inputted to processor 402, as indicated by 414 and 416, respectively.

Based on the received inputs, processor 402 may execute computer-executable instructions to anticipate demand for the network and maintain capacity of the network. In particular, processor 402 may include instructions to calculate a TOTAL NETWORK CAPACITY (TNC) at a particular future time based on the PRESENT NETWORK CAPACITY (PNC) and the PLANNED CHANGE IN NETWORK CAPACITY (PCNC), as indicated at 418. Processor 402 may also include instructions to calculate a TOTAL USER DEMAND (TUD) at the future time based on the PRESENT USER DEMAND (PUD) and the CHANGE IN USER DEMAND (CUD), as indicated at 420. At 422, processor 402 may include instructions to calculate a PREDICTED UTILIZATION (PU) of the network at the future time by dividing the TOTAL USER DEMAND (TUD) by the TOTAL NETWORK CAPACITY (TNC), according to one exemplary embodiment of the invention. As indicated at 424, if the PREDICTED UTILIZATION (PU) is less than the MINIMUM ACCEPTABLE UTILIZATION (MinAU) or greater than the MAXIMUM ACCEPTABLE UTILIZATION (MaxAU), then processor 402 may include instructions to calculate a DETERMINED CHANGE IN NETWORK CAPACITY (DCNC) to be applied to the network. In the scenario that the DETERMINED CHANGE IN NETWORK CAPACITY (DCNC) is positive, processor 402 may include instructions to determine a LEAD TIME at 426 such that DETERMINED CHANGE IN NETWORK CAPACITY (DCNC) may be installed to the network before or at the future time in order to accommodate user demand.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of comprising:
   determining one or more future times for which a bandwidth capacity of the network is evaluated;
   determining total bandwidth capacities of the network for respective future times;
   determining total demands of users for the network for respective future times;
   determining, by a computing device, predicted utilizations of the network for respective future times as functions of corresponding total demands of users and corresponding total bandwidth capacities of the network;
   determining respective maximum acceptable utilizations of the network for the respective future times;
   comparing, by the computing device, respective predicted utilizations of the network to corresponding maximum acceptable utilizations of the network for the respective future times;
   determining, for respective future times, changes in total network bandwidth capacity to be applied to the network in order to increase the total bandwidth capacity of the network based at least partly on said comparing of respective predicted utilizations of the network to corresponding maximum acceptable utilizations;
   determining, for respective future times, lead times for adding one or more products for providing the determined changes in total network bandwidth capacity, wherein the lead times indicate respective amounts of time needed for delivery and installation of the one or more products; and
   initiating the determined changes in total network bandwidth capacity in advance of respective future times by at least the determined corresponding lead times.

2. The method of claim 1 wherein said determining total bandwidth capacities of the network for respective future times comprises determining present bandwidth capacities of the network and identifying planned changes in network bandwidth capacity to be applied to the network between a present time and respective future times.

3. The method of claim 1 wherein said determining, for respective future times, changes in total network bandwidth capacities comprises determining the changes in the total network bandwidth capacities based on at least one or more of the following: a current utilization of the network, a growth trend of a utilization of the network, or a cost measure of a bandwidth capacity to be added to the network.

4. The method of claim 3 wherein the current utilization of the network is indicative of a high percent usage of a present bandwidth capacity of the network for a particular percentage of time.

5. The method of claim 3 wherein the growth trend is based on a regression of data representative of a past growth of the utilization of the network.

6. The method of claim 1 wherein said determining, by the computing device, predicted utilizations of the network comprises determining the total demands of users for the network at the respective future times as a function of at least a present demand of users for the network and a change in demand of users for the network between a present time and respective future times.

7. The method of claim 6 wherein the change in demand of users for the network comprises a demand requirement for a roll-out of an application operating via the network.

8. The method of claim 1 wherein said determining, by the computing device, the predicted utilizations of the network for respective future times comprises dividing the total demands of users for the network by the total bandwidth capacities of the network for respective future times.

9. The method of claim 1 wherein the maximum acceptable utilizations for respective future times is a function of a response time of an application operating via the network.

10. The method of claim 9 wherein the response time of the application is a function of one or more of the following: a distance between a client and a server of the application wherein the client and server are coupled to the network, a connection speed of the client to the network, or a utilization of the network during a period of time at which the client accesses the application.

11. The method of claim 1 further comprising:
    planning a budget for applying the determined changes in total network bandwidth capacity to the network; and
    determining a cost measure of the determined changes in network bandwidth capacity.

12. The method of claim 11 wherein said determining the cost measure of the determined change in network bandwidth capacity comprises determining a monetary cost measure of the determined change in network bandwidth capacity by analyzing past trends of cost increases or decreases for networks of similar size, distance, and location.

13. The method of claim 1 wherein the one or more future times are on fixed time intervals.

14. The method of claim 1, further comprising determining the changes in total network bandwidth capacity at least partly based on an amount of time the network is over utilized.

15. The method of claim 14, wherein the changes in total network bandwidth capacity is substantially zero if the network is over-utilized below a first amount of time during an evaluation time period.

16. The method of claim 15, wherein the first amount of time is less than a majority of the evaluation time period.

17. A system comprising:
    a processor configured to execute computer-executable instructions in order to cause the system to perform operations comprising:
    determining a future time for which a bandwidth capacity of the network is evaluated;
    determining a total bandwidth capacity of the network for the future time;
    determining a total demand for the network for the future time;

determining a predicted utilization of the network for the future time as a function of the total demand and the total bandwidth capacity of the network;

determining a maximum acceptable utilization of the network for the future time;

comparing the predicted utilization of the network to the maximum acceptable utilization of the network for the future time;

determining, for the future time, a change in total network bandwidth capacity to be applied to the network in order to increase the total bandwidth capacity of the network based at least partly on said comparing the predicted utilization of the network to the maximum acceptable utilization;

determining, for the future time, a lead time for adding one or more products to provide the determined change in total network bandwidth capacity to the network, wherein the lead time indicates an amount of time needed for procuring the one or more products; and scheduling the procurement of the one or more products in advance of the future time by at least the determined lead time.

18. The system of claim 17 wherein said determining the total bandwidth capacity of the network comprises determining a present bandwidth capacity of the network and identifying a planned change in network bandwidth capacity to be applied to the network between a present time and the future time.

19. The system of claim 17 wherein said determining a change in network bandwidth capacity comprises determining one or more of the following: a current utilization of the network, a growth trend of a utilization of the network, or a cost measure of a bandwidth capacity to be added to the network.

20. The system of claim 19 wherein the current utilization of the network is indicative of a high percent usage of a present bandwidth capacity of the network for a particular percentage of time.

21. The system of claim 19 wherein the growth trend is based on a regression of data representative of a past growth of the utilization of the network.

22. The system of claim 17 wherein said determining a total demand for the network at the future time comprises determining a present demand of users for the network and determining an anticipated change in demand of users for the network between a present time and the future time.

23. The system of claim 22 wherein said determining an anticipated change in demand of users for the network comprises determining a demand requirement for a roll-out of an application operating via the network.

24. The system of claim 17 wherein said determining a predicted utilization of the network at the future time comprises dividing the total demand of users for the network by the total bandwidth capacity of the network at the future time.

25. The system of claim 17 wherein the acceptable utilization of the network is a function of a response time of an application operating via the network.

26. The system of claim 25 wherein the response time of the application is a function of one or more of the following: a distance between a client and a server of the application wherein the client and server are coupled to the network, a connection speed of the client to the network, or a utilization of the network during a period of time at which the client accesses the application.

27. The system of claim 26 wherein the operations further comprise planning a budget for applying the determined change in network bandwidth capacity to the network and determining a cost measure of the determined change in network bandwidth capacity.

28. A non-transitory computer-readable storage medium having stored thereon computer-executable instructions that, in response to execution by a computing device, cause the computing device to perform operations comprising:

determining a future time for which a bandwidth capacity of the network is evaluated;

determining a total bandwidth capacity of the network for the future time;

determining a total demand for the network for the future time;

determining a predicted utilization of the network for the future time as a function of the total demand and the total bandwidth capacity of the network;

determining a maximum acceptable utilization of the network at the future time;

determining, for the future time, a change in total network bandwidth capacity to be applied to the network in order to increase the total bandwidth capacity of the network, the change based at least partly on a difference between the predicted utilization of the network and the maximum acceptable utilization;

determining a lead time for adding one or more products for providing the determined change in total network bandwidth capacity to the network, the lead time indicating an amount of time needed to procure the one or more products; and initiating procurement of the one more products in advance of the future time by at least the determined lead time.

29. The non-transitory computer-readable storage medium of claim 28 wherein the lead time is a function of an installation time for installing the one or more products and an advance purchase time for obtaining the one or more products.

30. The non-transitory computer-readable storage medium of claim 28 wherein said determining the total bandwidth capacity of the network at the future time comprises:

determining a present bandwidth capacity of the network; and identifying a planned change in network bandwidth capacity to be applied to the network between a present time and the future time.

31. The non-transitory computer-readable storage medium of claim 28 wherein said determining, for the future time, the change in network bandwidth capacity utilizes one or more of the following:

a current utilization (CU) of the network, a growth trend of a utilization of the network, or a cost measure of a bandwidth capacity to be added to the network.

32. The non-transitory computer-readable storage medium of claim 28 wherein said determining the total demand for the network at the future time comprises:

determining a present demand of users for the network; and determining a change in demand of users for the network between a present time and the future time.

33. The non-transitory computer-readable storage medium of claim 28 wherein determining the predicted utilization of the network at the future time comprises dividing the total demand for the network by the total bandwidth capacity of the network at the future time.

34. The non-transitory computer-readable storage medium of claim 28 wherein the acceptable utilization of the network is a function of a response time of an application operating via the network.

35. The non-transitory computer-readable storage medium of claim 28 wherein the operations further comprises:
   planning a budget for applying the determined change in network bandwidth capacity to the network; and
   determining a cost measure of the determined change in network bandwidth capacity.

* * * * *

UNITED STATES PATENT AND TRADEMARK OFFICE
CERTIFICATE OF CORRECTION

| | | |
|---|---|---|
| PATENT NO. | : 8,015,289 B2 | Page 1 of 1 |
| APPLICATION NO. | : 10/733866 | |
| DATED | : September 6, 2011 | |
| INVENTOR(S) | : Hill et al. | |

It is certified that error appears in the above-identified patent and that said Letters Patent is hereby corrected as shown below:

On the Title Page, item (54), under "Title", Line 1, delete "METHOD PREDICTING" and insert -- METHOD FOR PREDICTING --.

Column 1, line 1, delete "METHOD PREDICTING" and insert -- METHOD FOR PREDICTING --.

Column 17, line 26, in Claim 1, delete "method of comprising:" and insert -- method comprising: --.

Column 20, line 19, in Claim 28, delete "at" and insert -- for --.

Column 20, line 31, in Claim 28, delete "one more" and insert -- one or more --.

Column 20, line 60, in Claim 33, delete "wherein determining" and insert -- wherein said determining --.

Signed and Sealed this
Twenty-eighth Day of February, 2012

David J. Kappos
*Director of the United States Patent and Trademark Office*